Nov. 24, 1931.  J. W. BRUNDAGE  1,832,856
VULCANIZER
Filed March 14, 1928   2 Sheets-Sheet 1

Inventor
James W. Brundage.

Attorney

Nov. 24, 1931.   J. W. BRUNDAGE   1,832,856
VULCANIZER
Filed March 14, 1928    2 Sheets-Sheet 2

Inventor
James W. Brundage.

Attorney

Patented Nov. 24, 1931

1,832,856

REISSUED

UNITED STATES PATENT OFFICE

JAMES WILLIAM BRUNDAGE, OF AKRON, OHIO, ASSIGNOR, BY MESNE ASSIGNMENTS, TO NATIONAL RUBBER MACHINERY COMPANY, OF AKRON, OHIO, A CORPORATION OF OHIO

VULCANIZER

Application filed March 14, 1928. Serial No. 261,449.

The invention relates to vulcanizing apparatus and it is particularly directed to a vulcanizing unit especially adapted for vulcanizing rubber pneumatic tires and inner tubes therefor.

Several types of rubber inner tubes are manufactured, among which are those formed and completely vulcanized upon straight mandrels; others are formed and completely cured upon curved mandrels and still a third class are known as molded tubes. One object of the present invention is to provide a vulcanizing unit that is especially adapted for quantity production of molded inner tubes.

Among the advantages derived from the present invention are the features of providing positive and accurate engagement of mating mold sections, the positive positioning of the valve stem, and ease of operation. Other advantages derived from the apparatus are exemplified in the requirement of a minimum amount of floor space, in comparison to the productive capacity of the apparatus, in addition to the fact that the device is of relatively light weight and consequently may be rearranged with other factory units from time to time to secure efficiency in the progressive production of the articles above designated.

The foregoing objects and advantages of the invention will become apparent from the following description thereof, considered in conjunction with the accompanying drawings, and as particularly pointed out in the appended claims.

In practicing my invention, a vulcanizing unit is provided by mounting a flexible, inflatable member upon a suitable base that is adapted to support a plurality of mating mold sections, the lower section of which is adapted to be moved or forced by the inflatable member into close engagement with the upper mold section, movement of such lower section being limited by members secured to the base. Means is provided for manually locking the mold sections together that is particularly rapid in operation, because of requiring a single rotative movement to effect a locking engagement of the interlocking members thereof. The upper mold section is pivotally mounted for opening and closing the mold and such operation is accomplished by fluid controlled means that is adapted to effect a cushioning on the closing movement of the pivoted section. All of the foregoing features combine to facilitate quick and effective operation of the device as a unit, a minimum amount of manual labor being required to effect the vulcanization of an inner tube.

Figure 1:
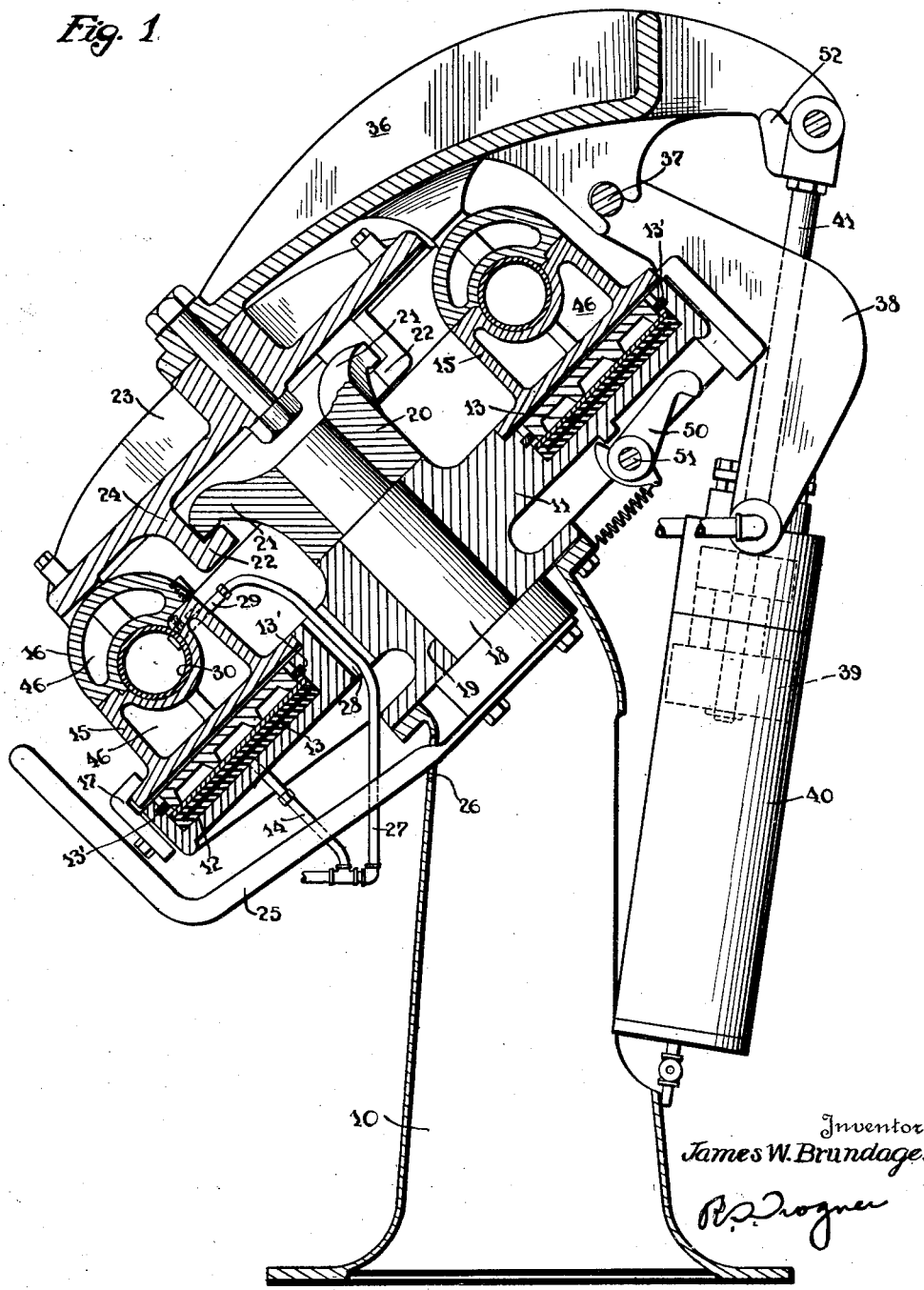
Fig. 1 is a side elevational view, partially in section, of a vulcanizing unit constructed in accordance with the principles of my invention.
Figure 2:
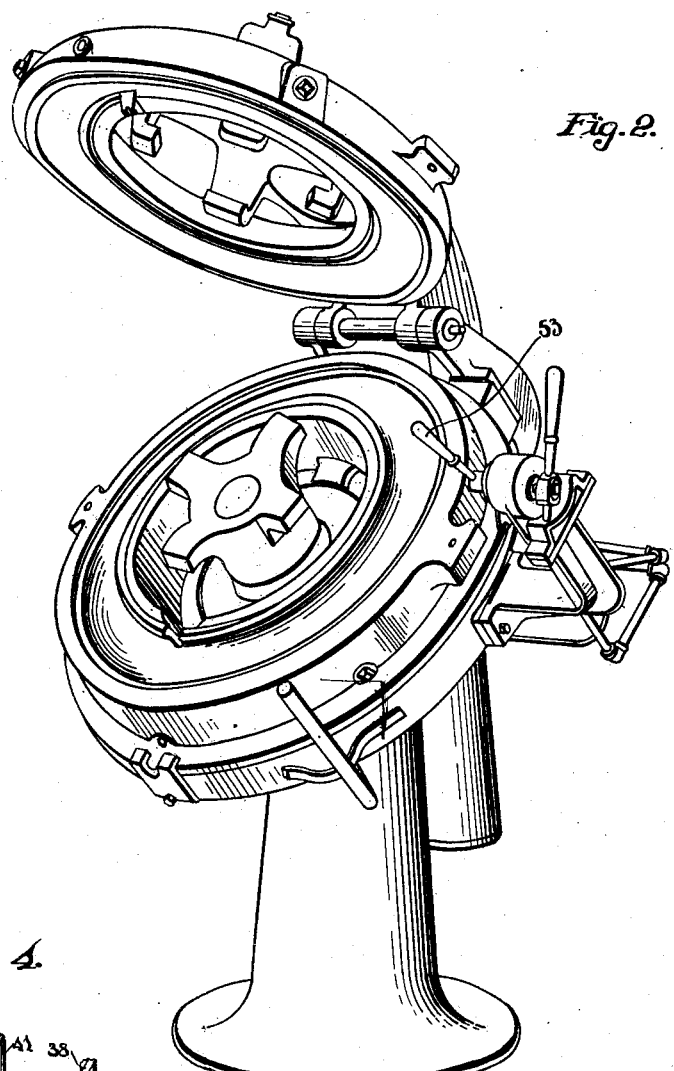
Fig. 2 is a perspective view of the complete device, showing the upper mold member in the open position.

For a better understanding of my invention, reference may now be had to the accompanying drawings, in which is shown a vulcanizing unit comprising a suitable pedestal 10 upon which is secured an annular supporting member or base 11 arranged at an angle to said pedestal for convenience in inserting and removing the work and for providing drainage of water of condensation from the lowest portions of the mold steam jackets. The base is provided with an annular channel 12 adapted to receive a flexible inflatable member 13 or annular, flat pressure bag, provided with a conduit 14. A lower jacketed mold section 15 is movably mounted upon and mainly outside of or above the base member 11 and adapted to be forced into close engagement with its complemental mating jacketed mold section 16 by inflation of the member 13, such movement of the section 15 being guided at one periphery only, namely in this case the inner periphery of said mold section, by means of the short cylindrical guide seen in Fig. 1, whereby the cost of manufacture is reduced and any liability to cramping of the mold section is practically eliminated. The steam-jacketed mold sections are completely demountable from the press so that others of a different size may be substituted. For retaining the lower mold section against accidental displacement I show at the lower edge an overhanging angular bracket 17 secured to the supporting member 11. It will be noted that the mold cavity is of smaller projected area than the pressure bag 13, which covers the inner and outer peripheral mold joints, so that the mold-closing pressure of said bag is directly transmitted to both of said joints. To prevent displacement or excessive expansion of the member 13 in the event fluid is admitted to the member when the mold sections 15 and 16 are not properly positioned, split stop rings 13' are provided in the channel 12 and spaced from the member a distance slightly greater than the clearance between the stationary and movable locking members comprising the mold locking means in a manner later to be described. Interposed between the member 13 and the mold member 15 are two annular follower plates which not only act as filler plates of which the upper one serves as a press platen but also as heat dissipating media, thereby preventing the passage of high temperatures from the mold member 15 to the flexible member 13. Means is provided for locking the mating mold sections 15 and 16 together, which includes a shouldered shaft 18 disposed in a central opening 19 in the member 11 and provided with a head 20 having radiating arms or locking lugs 21 that are adapted to engage by rotative movement cooperating arms or locking lugs 22 formed upon a bracket member 23 secured to the mold section 16 in any suitable manner, for example, integrally cast thereto as indicated at 24.

The shaft 18 is manipulated by means of a handle 25 secured thereto and extended through an opening 26 in the pedestal 10 to a convenient position. A flexible pipe 27 connected to the conduit 14 is extended through an opening 28 in the annular supporting member 11 and is connected to a valve stem 29 of an inner tube 30, disposed within the mold sections 15 and 16, whereby the inner tube may be inflated to a vulcanizing position. The valve stem is maintained in a fixed position within a depression in the edge of the mold members by means of a pin 31 provided with a head 32 disposed in an opening 33 in the mold sections and urged outwardly into engagement with the valve stem by means of a spring 34, a drilled plug 35 being disposed in an enlarged portion of the opening 33 to limit outward movement of the pin 31.

The upper mold section 16 is removably secured, by means of bolts, to the member 23 which is pivotally mounted, to provide access to the molding cavity formed by the mating sections, by means of a plurality of arms 36 formed upon the member 23 and pivotally secured, as indicated at 37, to a plurality of bell-crank brackets 38 bolted or otherwise secured to the supporting member 11. Opening and closing movement of the mold section 16 is obtained by operation of a piston 39 mounted within a cylinder 40 that is pivotally secured to the brackets 38, the piston being connected by a piston rod 41 to the arms 36. The upper portion of the cylinder is provided with passages 43 communicating with conduits 44 that are connected in any suitable manner to a suitable source of compressed air or other suitable operating medium. Swing joints 44' are provided in the air supply line to facilitate the movement of the cylinder during its operation. An opening is provided in the bottom of the cylinder to receive a suitable conduit 42 which is connected to one of the passages 43, see Fig. 4. A bleeder valve 42' is also provided in the bottom of the cylinder for a purpose to be later described. An additional outlet or by-pass 45 is provided in the top of the cylinder that communicates with the conduit 44 shown at the right in Fig. 4, and passage of air therethrough is regulated by means of a threaded constricting valve or plug 146 screwed into the top of the cylinder.

It is preferable that the various conduits 27, 14 and 44 be connected to the same source of air supply and should be controlled by a single valve that may be manipulated to effect closure of the mating mold sections and thereafter to inflate the flexible member 13 and the tube 30 that is to be molded.

The upper and lower mold sections 15 and 16 are preferably cast with annular cavities or chambers 46 adjacent the inner molding surfaces thereof to permit of the circulation of a suitable curing medium, such as steam, hot water or electricity, in a manner which is well-known to the art.

To prevent accidental closing of the upper mold member 16, a spring actuated latch 50 keyed or otherwise secured to a shaft 51 mounted in suitable bearings carried by the supporting member 11, is arranged to engage a lug 52 carried by the upper end of the piston rod 41 when the piston 39 is at its lowermost position. Releasing means is provided which includes a handle 53 and a series of links 54 interposed between the handle and the shaft 51, whereby the latch may be released at the will of the operator. The operation of the device will be apparent from the foregoing description.

Figure 4:
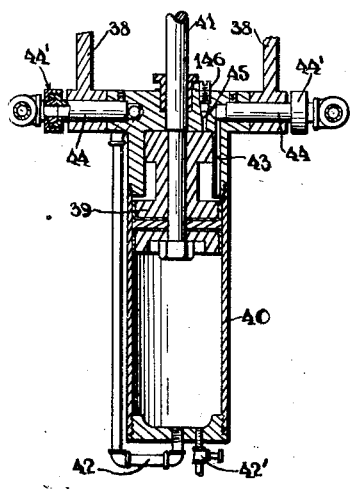
Fig. 4 is a cross-sectional view of a pneumatically operated means for actuating one of the mold sections of the apparatus shown in the previous figures.
Figure 3:
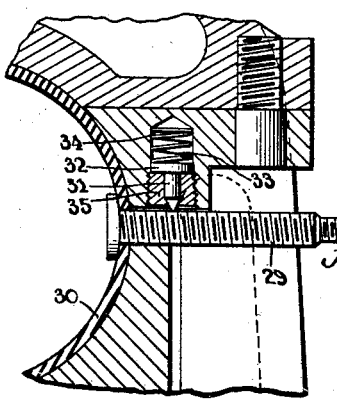
Fig. 3 is a fragmentary, cross-sectional view of a portion of the apparatus shown in Figs. 1 and 2, particularly illustrating means for securing a valve stem of an inner tube that is being manufactured in fixed position.

The mold is opened by admitting compressed air through the right-hand one of the conduits 44 in Fig. 4 to force the piston 39 toward the bottom of its cylinder 40, thereby operating the connecting rod 41 to actuate the mold section 16 and cause it to assume its open position. It will be apparent that as the mold section 16 swings to its upper position the cylinder 40 is swung inwardly towards the base 10 to permit of free movement of the piston 39 and consequently the connecting rod 40, this being made possible by the pivotal mounting of the cylinder upon the brackets 38.

The tube 30 is then partially inflated and disposed in the molding cavity of the lower section 15 with its valve stem correctly positioned between the mold members, whereupon compressed air is admitted into the bottom of the cylinder 40 through the passage 42, and simultaneously exhausted from the upper end through the right-hand conduit 44 in Fig. 4, to force the piston 39 to its uppermost position, thereby causing engagement of the mating mold sections. It should be noted that the opening and closing movements of the upper mold section 16 may be cushioned by suitable adjustment of the bleeder valve 42′ and the plug 46, causing the air confined within the respective ends of the cylinder 40 to be expelled at a suitable rate to accomplish such result, the piston and cylinder being formed with dash-pot extensions at their upper ends as shown in Fig. 4 to cushion the closing movement.

Upon closure of the mating mold sections, the pin 31 firmly engages the valve stem 29 of the tube to maintain it in fixed position. This feature insures that the valve stem will not be displaced or forced into the uncured, or green rubber of the tube 30 when it is inflated to vulcanizing position. The handle 25 is then manipulated to rotate the head 20 of the interlocking means whereby the mold sections are locked together.

Air is next admitted through the conduits 14 and 27 to the inflatable member 13 and the tube 30.

The inflatable member 13 is preferably formed of considerably less volume and of a considerably larger area than the tube 30, in consequence whereof the mold sections are forced very firmly together before the tube is fully inflated, thereby preventing the inner tube stock from being forced between the mating edges of the mold members before the mold mates are tightly closed and also throughout the vulcanizing period. The flexible inflatable member 13 moves the lower mold section 15 toward its complemental section to assure intimate engagement of the sections, thereby supplementing the action of the locking member 20, which, in fact, need only to limit the outward movement of the upper section 16 in order to assure suitable positioning of the sections. Fluid pressure is maintained in the inflatable member 13, as well as in the tube 30, throughout the vulcanization period.

It will be apparent from the foregoing description that operation of the vulcanizing unit is obtained with very little expenditure of manual effort, it being only necessary to operate the valves to admit air and steam to the unit to effect accurate positioning of the parts and heating of the unit. The locking member is, of course, manually manipulated, but it is only necessary to give it a slight rotative movement to insure satisfactory operation of the flexible, inflatable member in effecting close engagement of the mold sections.

The pneumatically operated member for actuating the upper mold section need not be of heavy construction, since it is not required to maintain engagement of the mold sections, but simply facilitates opening and closing the mold. In fact, the entire vulcanizing unit need not be formed of heavy material because of the particular arrangement and operation of the several parts.

Although I have shown and specifically described a vulcanizing unit embodying the principles of my invention, it is obvious that various modifications may be made therein without departing from the spirit or scope thereof, and I desire, therefore, that only such limitations shall be imposed as are set forth in the accompanying claims.

What I claim is:

1. A vulcanizer press comprising a base, annular fluid-pressure means thereon, and a mold including a demountable annular section overlying and operated by said fluid-pressure means and guided on said base by one periphery only.

2. A vulcanizer press comprising a base, an annular pressure bag thereon, and a demountable annular mold, guided on said base by its inner periphery only, for actuation by said pressure bag.

3. A vulcanizer press comprising a base, a fluid-actuated mold section mounted thereon, a mating mold section hinged to open and close with respect to the fluid-actuated section when the latter is retracted, and a fluid-pressure device for operating said hinged section, having internal means for cushioning its closing movement.

4. A vulcanizer press comprising mating mold sections, one of which is hinged to open and close with respect to the other, and a fluid-pressure piston and cylinder connected to operate said hinged section and having a dash-pot portion for cushioning its movement, and a constricted by-pass outlet leading from the dash-pot cylinder portion.

5. A tube vulcanizer unit comprising a base, a fluid-actuated mold section mounted thereon, a mating mold section mounted to open and close with respect to said fluid-actuated section, and a spring-projected valve-stem gripper on said mating section and adapted to be pressed back and grip the valve by the projecting movement of said fluid-actuated section.

In witness whereof, I have hereunto signed my name.

Signed at Akron, in the county of Summit, and State of Ohio, this 16th day of February, 1928.

JAMES WILLIAM BRUNDAGE.